United States Patent [19]

Grant

[11] Patent Number: 4,485,834
[45] Date of Patent: Dec. 4, 1984

[54] ATOMIZATION DIE AND METHOD FOR ATOMIZING MOLTEN MATERIAL

[76] Inventor: Nicholas J. Grant, 10 Leslie Rd., Winchester, Mass. 01890

[21] Appl. No.: 327,698

[22] Filed: Dec. 4, 1981

[51] Int. Cl.³ .............................................. B22D 23/00
[52] U.S. Cl. ...................................... 164/46; 264/12; 425/7
[58] Field of Search ........................ 164/46; 264/12; 239/557; 425/7

[56] References Cited

U.S. PATENT DOCUMENTS

| | | | |
|---|---|---|---|
| 2,997,245 | 8/1961 | Nilsson | 241/1 |
| 3,663,206 | 5/1972 | Lubanska | 75/60 |
| 3,826,301 | 7/1974 | Brooks | 164/46 |
| 4,066,117 | 1/1978 | Clark | 164/46 |
| 4,374,789 | 2/1983 | Stuck | 264/12 |

FOREIGN PATENT DOCUMENTS 2340401  2/1975  Fed. Rep. of Germany .......... 425/7

Primary Examiner—Nicholas P. Godici
Assistant Examiner—P. Weston Musselman, Jr.
Attorney, Agent, or Firm—Hopgood, Calimafde, Kalil, Blaustein & Judlowe

[57] ABSTRACT

The die comprises at least one set of opposed linearly configurated die elements spaced in substantially parallel relationship to define a longitudinally configurated die space therebetween dimensioned to pass therethrough a sheet of the molten material, the die elements defining a nozzle assembly characterized by oppositely disposed orifice-bearing surfaces. Each of the linear die elements has a gas pressure manifold for receiving atomizing gas under superatmospheric pressure, each of the oppositely disposed nozzle-defining surfaces having at least one array of orifices extending therealong and embracing each side of the longitudinally configurated die space defined by the oppositely disposed linear die elements. Conduits are provided for communicating the orifices with the gas manifold, the array of orifices in each of the die elements being convergently directed towards the other through an included angle of, for example, 40° for directing atomizing gas against a predetermined focal region on a sheet of molten material passing through the longitudinal die space, each of the orifice conduits connected to resonating cavities for generating ultrasonic, high frequency shock waves for one-step disintegration of the sheet of molten material at said focal region into fine atomized particles which later solidify. The uses include the production of dry powders and liquid dynamically densified shapes, such as ingots, forging and rolling preforms and highly dense compacts.

16 Claims, 7 Drawing Figures

ATOMIZATION DIE AND METHOD FOR ATOMIZING MOLTEN MATERIAL

This invention relates to an atomization die and to a method of atomizing molten material which is solid or which hardens at room temperature in order to form atomized particles of controlled particle size when subjected to a high rate of solidification by the nature of the atomization process.

STATE OF THE ART

Following World War II, powder metallurgy (P/M) has increasingly become an important adjunct to the conventional production of metal parts, particularly in the production of complex alloy parts difficult to produce by conventional methods, such as by melting, casting, and hot and cold working.

A case in point is the latest generation of superalloys for use in jet aircraft. These alloys, when cast into ingots, are generally very difficult or impossible to hot work due to the presence of coarse segregates, coarse dendrites, and coarse grain size.

As part of P/M technology, one method has been to produce powders of complex alloys by atomization, wherein each particle is in effect a micro casting having a very fine metallurgical structure due to the rapid cooling of finely atomized molten material. Thus, each atomized rapidly solidified particle in the solid state is substantially a uniform relatively unsegregated representation of the original melt, such that a sintered or other consolidated part produced from the atomized powder has a substantially uniform chemical composition and overall a substantially uniform metallurgical structure as compared to conventionally produced castings.

Methods for producing atomized powders and shapes therefrom are well known in the art. In this connection, reference is made to U.S. Pat. No. 4,066,117 which relates to the spray casting of gas atomized molten metal to produce high density ingots. In this patent, a detailed method is disclosed for atomizing molten metal for spray casting, such as heat resistant nickel-base alloys, in which an atomizing apparatus is described comprising an array of high pressure gas jets concentrically disposed relative to a central flow of a molten metal stream substantially cylindrical in shape, the jets being focused downwardly at a predetermined small segment of the molten stream in order to cause it to shatter into minute molten particles prior to casting of the particles into a receiving mold.

In U.S. Pat. No. 2,997,245, a method and die are disclosed for the production of atomized particles using high frequency shock waves. It is pointed out in the patent that one of the objects is to produce atomized particles having a narrow particle size range as opposed to prior atomization methods which produced disparate particle sizes. As an example, the patent mentions a particle size range of 0.5 to 2 microns. In its broad aspects, the method described in U.S. Pat. No. 2,997,245 comprises generating a sequence of wave fronts, each of the wave fronts being initially on generation composed of compressional waves in the form of shock waves which remain in that form. The thus-produced shock wave fronts are then caused to impinge in sequence onto a small volume of a molten cylindrical stream of material from all sides, the shock wave fronts being composed of compressional waves having an ultrasonic frequency and also advancing at supersonic velocity adapted to produce alternately compressive and expansive forces in the small volume of the molten stream to cause disintegration thereof into fine particles.

This method is advantageous in that the particle size can be controlled by controlling the frequency of the shock wave; the higher the frequency, the smaller the particles. Also, the higher the amplitude of the shock waves, the smaller the particles produced. However, a disadvantage with a cylindrical die having nozzles disposed peripherally therearound is the limitation in the size of the stream that can be completely disintegrated into small particles. If the diameter of the stream is too large, for example, exceeds substantially 5 mm in diameter, only the outer rim of the stream tends to be disintegrated while the center core of the stream passes on through the disintegrating zone virtually untouched.

Articles have been written on the theory of atomization of metals, reference being made to the following: "The Disintegration of Liquid Lead Streams by Nitrogen Jets" by J. Bruce See et al, *Metallurgical Transactions* Volume 4, November 1973 (pp. 2669 to 2673) and "Atomization of Specialty Alloy Powders" by Alan Lawley, *Journal of Metals,* January 1981 (pp. 13 to 18).

The foregoing articles discuss in some detail the breakup of a liquid metal stream when gas atomized using conventional procedures. According to the articles, the overall process of gas atomization consists of three stages: (I) primary breakup of the liquid stream, (II) the secondary disintegration of the droplets into fine particles while they are still molten, and (III) the solidification of the particles. It is generally believed that a sinuous wave is initiated which rapidly increases in amplitude, the wave then detaching itself from the bulk liquid of the stream to produce ligaments and flakes or platelets which subsequently break down during secondary disintegration. A model as applied to a sheet of liquid metal is referred to based on work by Dombrowski and Johns (Chem. Eng. Sci. 18 (1963) pp. 203–214), in which the sheet undergoes (1) sinuous wave formation, (2) ligament formation, and (3) finally ligament breakdown into droplets.

The three-stage formation of atomized particles is characteristic of straightforward gas atomization at normal gas velocities (0.5 Mach, for example). This technique does not assure close particle size control. With ultrasonic gas atomization, at gas velocities of 2 to 2.5 Mach, the extremely high velocity impact of the pulsed gas leads to extreme rigidity of the liquid stream which nevertheless still has very low shear resistance. The high energy, high rate gas impact results in single step disintegration of the liquid stream as seen in high velocity movies. Further, the liquid droplets are accelerated at very high velocity in the resultant gas atmosphere. The combination of fine liquid droplets in a narrow size range, plus the high velocity of the droplets, leads to rapid solidification or quenching, which is a major advantage of this process.

As stated earlier, a limitation in the atomization of metals has been the dimensional limitations of cylindrically configurated atomizing dies. It would be desirable to provide an improved atomization die and method capable of providing high production atomization rates of powder material, e.g., metal powder.

OBJECTS OF THE INVENTION

An object of the invention is to provide an improved method for atomizing liquid streams of material which exist in the solid state at room temperature.

Another object is to provide an improved die assembly for atomizing molten materials, said die assembly being characterized by a linearly configured space or opening through which a ribbon of molten material is fed for the gas atomization thereof.

These and other objects will more clearly appear when taken in conjunction with the following disclosure, the appended claims and the accompanying drawings, wherein:

STATEMENT OF THE INVENTION

Figure 1:
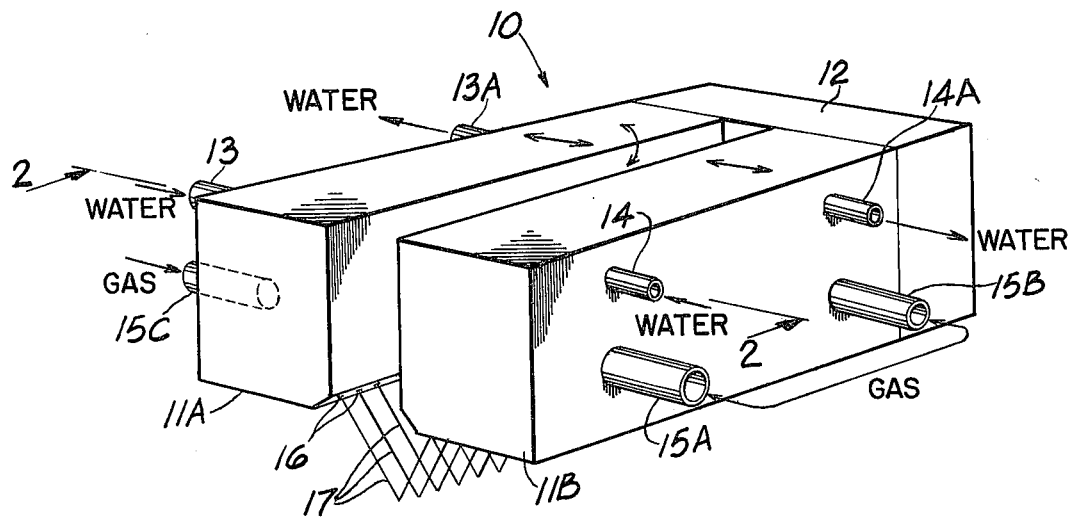
FIG. 1 is a schematic rendition of a die assembly comprising a parallel arrangement of linear die elements which have a linear array of gas orifices, the parallel die elements defining between them a longitudinally configured opening or gap through which a sheet of molten material is passed for the ultrasonic gas disintegration thereof.

One embodiment of the invention resides in a linearly configured atomization die assembly, particularly suited for but not limited to the ultrasonic gas atomizing of molten material which normally exists in the solid state at room temperature, the die comprising at least one set of opposed linearly configured die elements spaced in substantially parallel relationship to define a longitudinally configured die space or gap therebetween dimensioned to pass therethrough a sheet of molten material, the die elements defining a nozzle assembly characterized by oppositely disposed orifice-bearing surfaces disposed along the die, one on each of the die elements. The die elements are preferably adjustably mounted to provide lateral adjustment as well as angular adjustment about a pivot. Each of the linear die elements has a chamber for receiving atomizing gas under superatmospheric pressure. The oppositely disposed orifice-bearing surfaces forming the nozzle assembly have a linear array of orifices extending therealong and embracing each side of the rectangular die space. Conduit means are provided for communicating the orifices with the gas chamber, the linear array of orifices on each die element being convergently directed towards the other for preferably directing an ultrasonic atomizing gas against a predetermined focal region of a sheet of molten material passing through the die space or gap between said array or sets of orifices, each of the orifice conduits having resonating cavities cooperably associated therewith for generating ultrasonic high frequency shock waves for disintegrating the sheet of molten material at the focal region into fine particles.

Another embodiment of the invention comprises a method of atomizing molten material which exists as a solid at room temperature, which method includes the steps of providing a free flowing stream of molten material in the form of a sheet, and then passing the free flowing sheet of molten material through a rectangular die space of sufficient opening to accommodate the molten material for atomization thereof, the rectangular die space having a linear array of gas flow orifices on each side thereof spanning the width of the sheet and directed towards the sheet of molten material, each of the linear arrays of orifices converging relative to the other towards a predetermined focal region of atomization of said molten sheet. The atomization of the molten stream is effected by feeding gas under superatmospheric pressure to the orifices, and through at supersonic velocity in the form of high frequency shock waves, thereby disintegrating the sheet of molten material at the focal region so as to produce atomized particles of controlled particle size and narrow size range.

An advantage of the invention is that the linear die enables production rates far beyond those obtainable with cylindrical gas-atomizing dies. For example, assuming that a cylindrical die can atomize a cylindrical stream of diameter of not more than about 5 mm, the cross section of the stream would have an area of about 19 to 20 mm$^2$. On the other hand, a sheet of metal having a thickness of about 2 mm and a width of about 40 mm would have a cross sectional area of about 80 mm$^2$, or four times that of a cylindrical stream. Thus, assuming everything equal, including the linear rate of flow of the molten material, the linear die described above would be capable of increasing the production rate upwards of four times that of the circular die. A wider sheet or a larger thickness may increase the atomization rate even more.

Other advantages of the invention are that the die assembly, unlike the cylindrical die, may comprise two die elements capable of being adjustably set either laterally and/or at a predetermined angle relative to each other (note FIG. 3) to control atomization efficiency, back pressure (upward against the pouring system), and the lateral spacing between the two linear die elements or segments (which controls the distance of gas travel from the orifice exit to the point of contact with the molten sheet of poured material). Such control will regulate the gas flow to avoid turbulent flow.

Referring to FIG. 1, a die assembly is shown designated generally by the numeral 10 comprising linear die elements 11A, 11B disposed substantially parallel to each other, the two die elements being fixed in their relative position via a cross member or members 12. The two linear die elements or segments can be water- or gas-cooled if desired, die element 11A having water inlet and outlet ducts 13 and 13A and die element 11B similarly having water inlet and outlet ducts 14 and 14A.

Figure 3:
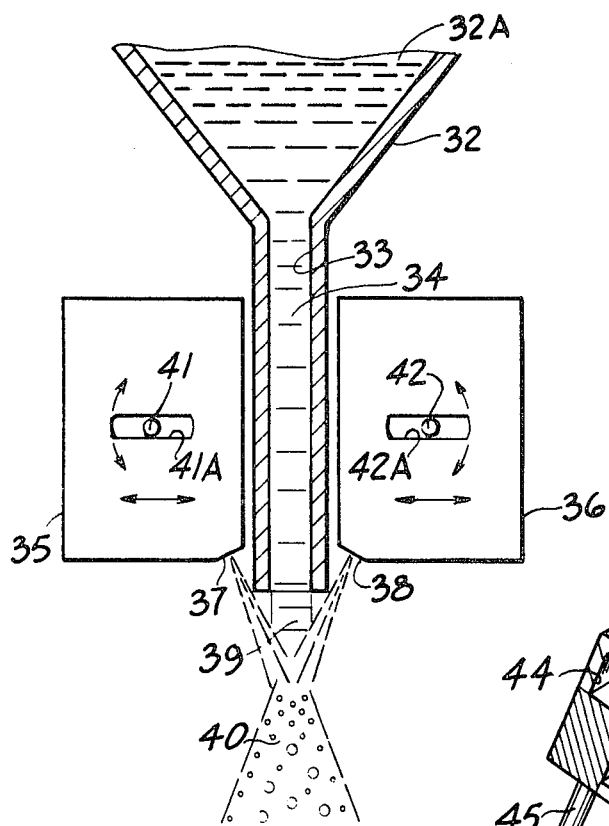
FIG. 3 is a schematic showing the flow of a sheet of molten material through the longitudinally configurated die opening or gap defined by the parallel disposed die elements.

Each of the die elements has gas duct manifolds, such as duct 15A, 15B, 15C, etc., shown for linear die elements 11B and 11A. The gas, e.g., argon, is fed under superatmospheric pressure and issues from linearly disposed orifices 16 at supersonic velocity as shock waves, the issuing gas jets 17 being focused as shown to impact a small volume of the sheet of molten metal passing between the two die elements (FIG. 3). In the alternative, the gas may enter through the opposite ends of the linear die elements.

Figure 2:
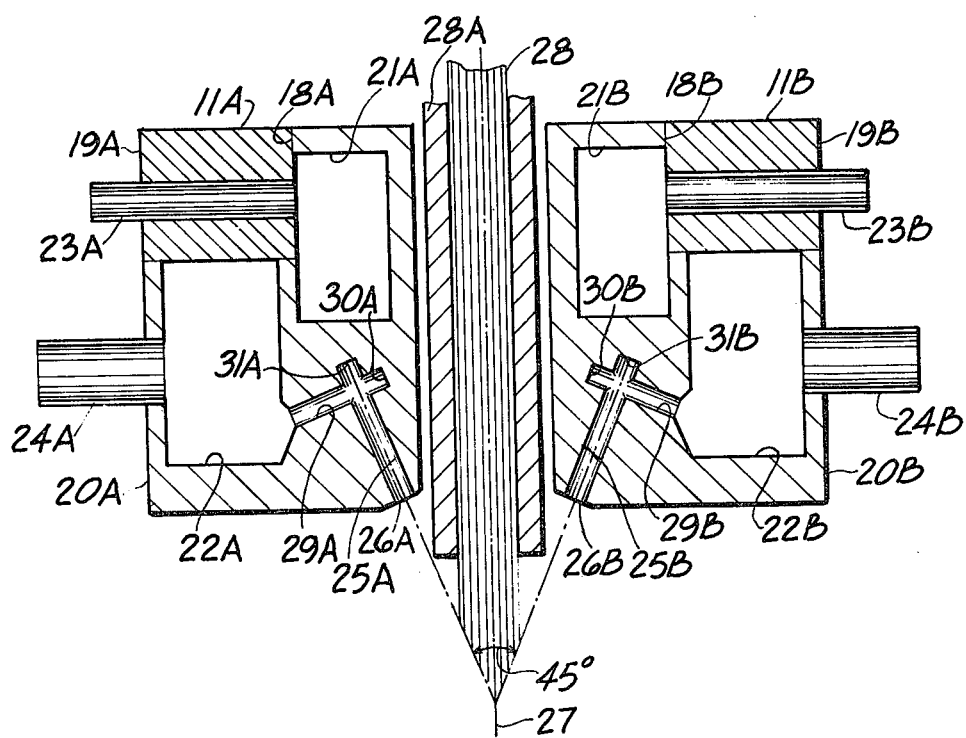
FIG. 2 is a cross section of the die assembly of FIG. 1 taken along line 2—2, said cross section being enlarged for purposes of clarity.

The inner details of one embodiment of the die assembly are shown in FIG. 2 which is an enlarged cross section taken along line 2—2 of FIG. 1. Thus, referring to FIG. 2, die elements 11A, 11B are shown made up of part segments welded together. In die element 11A, the welded segments include 18A, 19A, and 20A, while in element 11B, the corresponding welded segments are 18B, 19B, and 20B.

The welded segments define in each of the die elements water jackets 21A and 21B (if used), respectively, and gas manifolds or ducts 22A and 22B, the water jackets communicating with water inlets 23A and 23B, the water outlets being more clearly shown in FIG. 1. Likewise, the gas manifolds communicate with gas inlet ducts 24A and 24B, the gas passing through conduits 25A and 25B and out through orifices 26A, 26B, the orifices being directed convergently, one towards the other, and focused to a predetermined small volume on a sheet of liquid metal passing vertically between the two die elements (FIG. 3). As shown in FIG. 2, each of the orifice channels makes an angle of about 22.5° with center line 27 of the sheet of metal 28, the included angle being about 45°. The metal passes through ceramic (metallic, graphite, etc.) tube 28A.

The gas under superatmospheric pressure passes through chamber exit ducts 29A and 29B, respectively, of die elements 11A, 11B, the chamber exit ducts communicating with orifice channels 25A, 25B, respectively, such as to provide a pair of resonating cavities 30A, 30B in die element 11A and resonating cavities 31A, 31B in die element 11B.

When compressed gas under superatmospheric pressure (e.g., argon, helium, nitrogen, etc.) is supplied through gas inlets 24A, 24B and caused to flow out through chamber exits 29A, 29B and the gas is caused to reflect off resonating cavities 30A, 30B and 31A, 31B, non-stationary shock waves are generated as described in U.S. Pat. No. 2,997,245, the disclosure of which patent is incorporated herein by reference. The shock waves have a moveable wave front, supersonic speed, and ultrasonic frequency as they exit from orifices 26A, 26B.

The shock waves are generated in a series of steps. First, the gas escapes from the gas nozzles at supersonic speed; primary and secondary shock waves are generated by virtue of resonating cavities 30A, 30B, 31A, and 31B (Hartman reflecting chambers), with characteristic frequencies of about 20,000 to 30,000 cycles/second and at about 100,000 cps. The first shock wave is due to reflections from cavities 30A and 30B, the second reflections occurring at cavities 31A and 31B. The secondary shock wave is the stronger shock wave and has a frequency of about 100,000 cps.

The gas passes through conduits 25A, 25B and out through orifices 26A, 26B, in a pulsating manner, the shock wave front being of such velocity and intensity as to shatter the metal stream and convert it to atomized particles in one step. The gas exits out of the orifices at speeds of up to 2 to 2.5 Mach. The frequency ranges from about 20,000 to 30,000 cycles/second and about 100,000 cycles/second.

Typically, gas exit ducts 29A, 29B and conduits 25A, 25B will have the same cross-sectional dimensions, for example, about 0.8 mm.

The die elements may be separately supported and adapted to be set at a desired angle relative to the sheet of metal flowing between them as shown in FIG. 3 which depicts in cross section a trough or funnel 32 having a slotted opening 33 at the bottom through which a stream of molten metal 34 flows between die elements 35, 36 with orifices 37, 38 convergently focused to a small volume 39 of the sheet of molten metal to shatter it into atomized particles 40.

Figure 6:
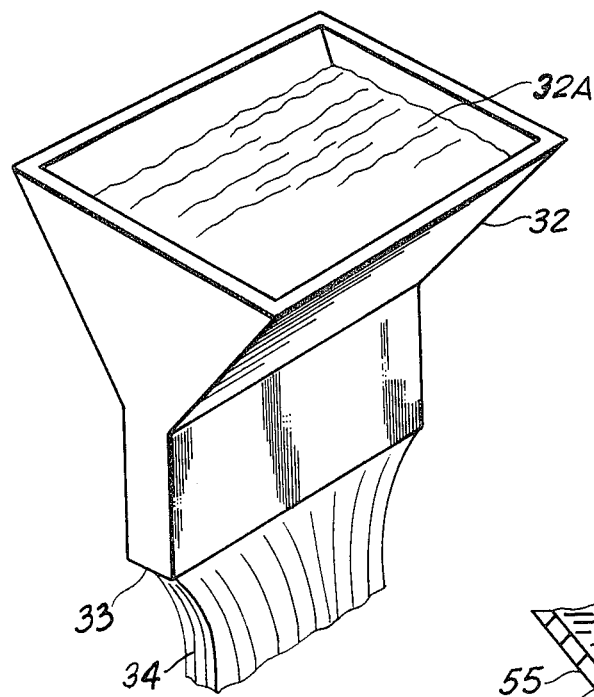
FIG. 6 depicts a rectangularly shaped metal trough or tundish adapted for feeding a sheet of molten material through the longitudinally configured opening of a die assembly of the invention.

It is desirable to maintain a constant head 32A (FIGS. 3 and 6) in funnel 32 to assure a continuous and a uniform flow rate of the molten material during atomization. The constant head is maintained by feeding molten metal into the funnel from a crucible or from a tundish. In a preferred embodiment, the die elements are axially mounted at fixed pivots 41, 42 to enable angular adjustment of one die element relative to the other according to the angle of impingement to be achieved. In addition, the dies may be laterally displaced relative to each other along slots 41A, 42A, respectively, via bolts not shown. In this connection, the die assembly of the invention is particularly advantageous as compared to the non-adjustable unitary cylindrical die of the type disclosed in U.S. Pat. No. 2,997,245.

Figure 4:
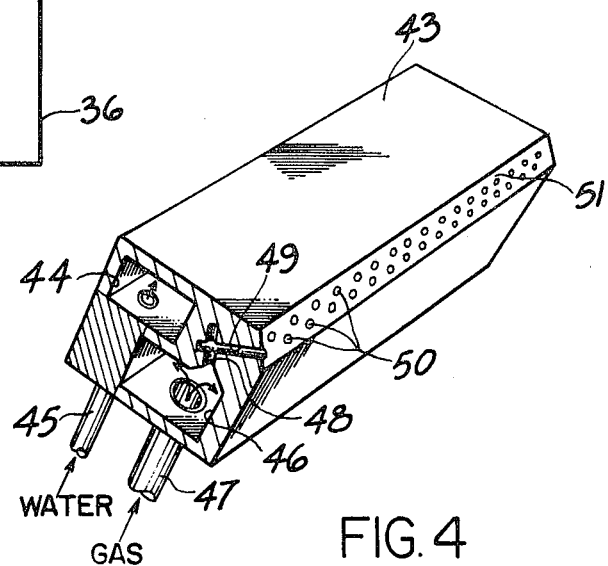
FIG. 4 is an angled view of a die element showing a staggered array of gas orifices disposed along a beveled face of a die element.

Another advantage of the die assembly is that the orifices can be linearly staggered in several rows along a bevelled face of the die element to provide maximum packing density as shown in FIG. 4, with each row having a slightly different angle of attack or impingement (note 39 of FIG. 3).

Thus, referring to FIG. 4, a die element 43 is depicted schematically as viewed from its underside, the die element showing a water jacket 44 which is fed by water inlet duct 45, the outlet duct being out of view. The die element has a gas manifold 46 which is fed by gas under superatmospheric pressure via gas inlet or duct 47 (which can be introduced in several ways, e.g., by gas inlets at the opposite ends of the die or at several inlets like duct 47 spaced along the linear die element), the gas manifold having a series of gas exit conduits 48 and 49 with resonating cavities of the type shown in FIG. 2. Each of the gas conduits 48, 49 connects the gas manifold to the orifices depicted by numeral 50, which are staggered linearly along bevel face 51 of the die element. By staggering the orifices on each bevel face, a judicious spreading of the gas stream exiting from the orifices can be obtained to encompass a predetermined small volume of the sheet of molten metal flowing between the die elements shown in FIG. 3. One, two, three or more such arranged rows can be prepared.

Figure 5:
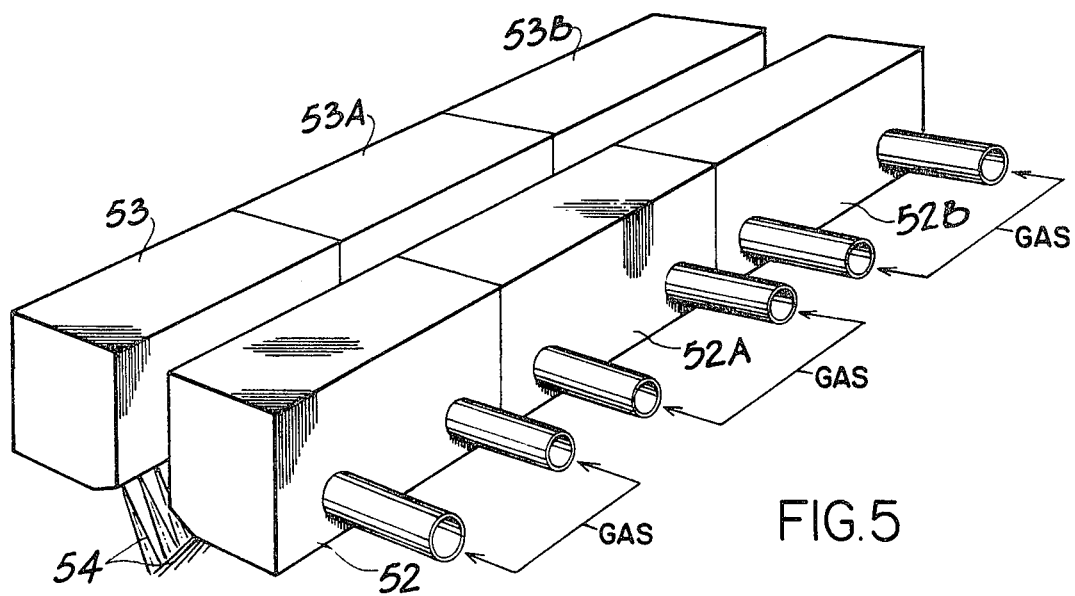
FIG. 5 is a schematic representation of a die assembly comprising a tandem arrangement of die elements illustrating how a sheet of larger width or a series of sheets can be accommodated by a die of linear configuration.

Another advantage of the linear die assembly provided by the invention is that since the die element can take on a rectangular shape, several die elements can be arranged in tandem fashion as shown in the schematic of FIG. 5, wherein die elements 52, 52A, and 52B are arranged in tandem in opposed relationship to corresponding die elements 53, 53A, and 53B, such that substantially wider sheets or interrupted segments of sheets of molten metal or other material can be atomized at high production rates. As shown in FIG. 5, the die elements are arranged to provide a correctly distributed flow of atomizing gas 54 which is focused to impinge on a predetermined small volume of a sheet of molten metal (not shown).

As stated earlier, the linear die assembly of the invention overcomes certain inherent disadvantages of unitary cylindrical dies in that a broad range of production rates can be obtained, depending upon the thickness of the molten stream and its width. Other advantages of the invention include (1) the preferred feature of varying the angle of impingement to change the included angle of impact depending upon the results to be achieved, and (2) of varying the distance of the jet nozzle outlet to the liquid sheet surface for greater size control of the atomized particle and to assure laminar flow rather than turbulent flow.

The thickness of the sheet will generally be in excess of 1 mm and range up to as high as 5 mm or more with the width of sheet of molten material being at least 5 times the thickness of the ribbon and generally over 10 times. Thus, assuming a thickness of about 3 mm and width of 40 mm, the cross section of the ribbon will be 120 mm$^2$. A cylindrical stream of molten metal of 5 mm in diameter has a cross sectional area of only approximately 20 mm$^2$. Assuming the same linear flow rate of molten material through the die aperture, the sheet of molten material of the aforementioned dimension would have a production rate of over 6 times that obtained with a cylindrical die. With a ribbon width of 50 mm and a thickness of 5 mm, a still higher cross sectional area of 250 mm$^2$ can be atomized.

The term molten material used in the context of this invention includes metals (e.g., alloys) and non-metals (certain glasses, polymers and ceramics) which exist in the solid state at room temperature.

Examples of atomizing metals or alloys are as follows:

A melt of 10 lbs. (4,540 grams) of a stainless steel composition (for example, type 316 stainless steel) is melted and adjusted to a temperature of 1600° C. to 1650° C. The melt is poured into a preheated tundish with a suitable nozzle (e.g., 20 mm$^2$ cross sectional area), which in turn is used to feed a pouring funnel of the type shown in FIGS. 3, 6, and 7, the exit rectangular tube of the funnel being disposed between the two linear die elements as shown. As the metal exits the pouring tube, high pressure argon gas is activated at, for example, 1200 psig. Atomization is accomplished at a rate of 1000 to 2000 lbs. per hour, achieving quench rates of 10$^5$ degrees C./sec. In a second case, a copper-base alloy of the composition Cu-5Ni-2.5Ti is similarly atomized using a pouring temperature of about 1200° C. In a third case, an aluminum alloy of the composition Al-4.2%Cu–1.6%Mg–0.5%Mn–3%Li is preheated to a temperature of 800° C. and atomized through the linear ultrasonic gas atomization die to produce minus 250 microns powders at quench rates of 10$^5$ degrees C./sec.

Examples of atomizing a non-metal material are as follows:

A 20 lb. melt (9,040 grams) of a borosilicate glass is melted and adjusted to a temperature which will result in a viscosity of about 100 poises to assure easy flow of the fluid glass. The glass is poured into a preheated tundish which in turn flows into the funnel delivery system as described hereinabove to provide a sheet of glass 2 mm thick and 25 mm wide. As the sheet of glass flows from the funnel into the gap between the two linear die halves, nitrogen gas, which is delivered to the atomizing dies at 1000 psig, exits the rows of orifices, ultrasonically pulsed, to atomize the glass into fine droplets which harden in the nitrogen atmosphere into fine uniform spheres. In a second instance, vanadium pentoxide ($V_2O_5$) is melted, heated to a temperature of 850° C. and is atomized using a pulsed air stream to provide a glassy product.

Figure 7:
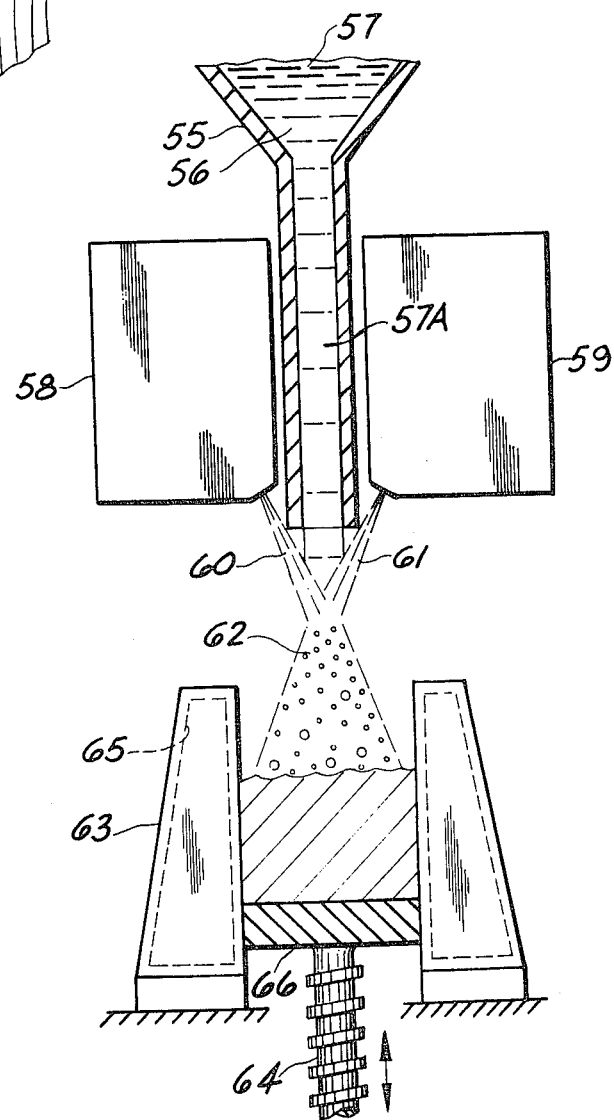
FIG. 7 shows a spray casting system for producing a metal ingot using the die and method of the invention, the system not being shown to scale for purposes of clarity.

Because the invention enables the production of molten atomized metal particles having a narrow particle size range, (solidification takes place in a rapid, predictable time), the invention is particularly applicable to the spray casting of metal ingots (reconstitution of ingots), the production of forging and extrusion preforms, and dense compacts. An example of spray casting is illustrated in the schematic of FIG. 7 which shows a funnel 55 of metal 56 maintained at a substantially constant head 57 to provide a uniform flow of a sheet 57A of molten metal passing between linear die elements 58, 59, the molten sheet being atomized by a supersonic flow of gas 60, 61 in the form of high frequency shock waves to form molten atomized particles which are directed to the interior of mold 63, for example, a water cooled copper mold with water jacket 65, the mold having a plate 66 which is movable supported as shown by worm 64 to enable vertical movement of the plate during the filling of the mold. The mold has a slight draft to assure downward movement of the plate as the ingot is being formed.

The production of a narrow range of atomized particles which are propelled at a very high velocity is critical to the successful spray casting of metal ingots, forging preforms and compacts. Further, it has been shown that the ultrasonic gas atomization process is a single step process wherein the liquid metal stream is fully atomized at the point of impact of the pulsed gas stream, which is very near the orifice or near points 60 and 61 in FIG. 7. This means that the atomization and particle flight patterns are well defined.

Based primarily on the liquid atomized droplet size and its velocity in the surrounding atmosphere (argon, nitrogen, helium, for example), one is able to determine the start and end of solidification. By maintaining the preferred distance from the point of atomization to the point of impact of the atomized droplets, one can assure that the great majority of the droplets will be 10% to 90% solidified at the point of impact in the mold.

The partially solidified droplets, delivered at very high velocity, are thus splat quenched (flattened out into thin discs from less than 1 to about 10 microns thick) against the mold surface or the previously laid down deposit resulting from spray casting, which preferably is called *Liquid Dynamic Compaction*. In splat quenching, the solidification rates will be near 10$^2$ °C./sec. and vary from 10$^2$ to 10$^5$ °C./sec. Secondary cooling, in the solid state, will be less, but the minimization of segregation, the production of a fine secondary dendrite arm spacing and a very fine grain size will depend on the solidification rate.

Since no copious continuous liquid phase can exist as in large castings, solidification is local, uniform and essentially free of porosity. Densities may be in excess of 99% and seldom less than 97%. The resultant reconstituted ingots, preforms and compacts have excellent hot working, and even cold working, characteristics as a result of the fine grained, relatively unsegregated, fine phase distribution. Structures and properties are often of such merit as to permit use of the spray cast product in the as-deposited condition.

As illustrative of the invention, the following examples are given:

EXAMPLE 1

In producing a spray-cast ingot, an austenitic stainless steel, type 316 containing 0.3% Ti and 0.05% C, is melted and preheated to 1600° C. The steel is poured into a tundish which in turn meters the flow of the alloy into the pouring and delivery funnel which permits the flow of a liquid sheet of alloy of dimensions 2 mm thick and 40 mm wide. Argon gas is delivered to the gas distribution manifold of the two aligned linear ultrasonic gas atomization dies at 1000 psig. The gas passes through the two Hartman reflection chambers in each die and exits as pulsed gas jets at Mach 2 to 2.5, with a primary frequency of about 100,000 cps and a secondary frequency between about 20,000 to 30,000 cps. The ultrasonically pulsed gas streams strike the liquid steel sheet and instantaneously atomize the liquid steel into droplets which are usually finer than 250 microns and are propelled at very high velocity in a narrow spray. The two halves of the linear dies are set to provide an included angle of about 45° or about 22½° between the gas jet and the plane of the metallic sheet. The die length is about 10% longer than the liquid steel sheet and the distance between the two parallel die halves is 10 mm.

The narrow spray will travel about 30 cm before it strikes the bottom of the ingot mold shown in FIG. 7. This allows for 10 to 90% solidification during flight and before splatting against the metallic substrate of the ingot mold, which is constructed of high conductivity copper (which may be water cooled if the ingot or compact is large). The copper mold acts as a high quench rate substrate to achieve high solidification and high secondary quench rates. The ingot mold is installed such that it has two dimensional translation, horizontally to permit ingot build-up uniformly, and an up and down motion to permit the ingot to grow in length by lowering the mold bottom to maintain the distance of flight of the partially solidified droplets to a constant distance from point of atomization to the plane of impact and form the ingot by liquid dynamic compaction. The resultant ingot (or compact) of about 25 cm diameter by 100 cm long with a high density, e.g., 99% or more, may be hot extruded into rod, bar or tubing achieving an average grain size of about 10 microns or less and is characterized by improved strength and ductility.

EXAMPLE 2

A superalloy designated as IN-100 is particularly suited for the method of the invention. This alloy which nominally contains 0.15% C, 10% Cr, 15% Co, 3% Mo, 4.7% Ti, 5.5% Al, 0.014% B, 0.06% Zr, 1% V, and the balance nickel is designed for casting purposes only. The cast alloy is normally coarse grained (4000 microns), has a segregated structure and is not forgeable. The alloy, which is supplied as vacuum melted stock, is melted, preheated to about 1550° C. and is atomized under similar conditions as in Example 1. Instead of producing an ingot or compact, the atomized partially solidified droplets are delivered into a copper forging preform in the shape of a small disc (or a jet engine bucket). The preform may have one surface which essentially reproduces one of the desired surfaces and shapes. The partially solidified atomized droplets, propelled at very high velocity, form a dense structure of about 99% or more density with ultra fine dendrite arm spacing and grain size, with minimum size of intermetallic phases. The as deposited structure is readily hot workable and produces a product with average grain size finer than 10 microns routinely and even less than 5 microns through careful control of processing variables. This structure generally has superplastic properties. Resultant properties at 20° C. show superior strength with elongation values of about 20% compared to values of less than 5% for conventional ingots or castings made under precision casting conditions.

Although the present invention has been described in conjunction with preferred embodiments, it is to be understood that modifications and variations thereto may be resorted to without departing from the spirit and scope of the invention as those skilled in the art will readily understand. Such modifications and variations are considered to be within the purview and scope of the invention and the appended claims.

What is claimed is:

1. A method of atomizing molten material which exists as a solid at room temperature which comprises:
   providing a free flowing stream of said molten material in the form of a sheet having a thickness of at least about 1 mm and a width of at least about 5 mm,
   passing said free flowing sheet of molten material through a longitudinally configurated die space of sufficient opening to accommodate said molten material for atomization thereof,
   said die space being defined by opposed linearly configurated die elements each having at least one linear array of gas flow orifices on each side thereof spanning the width of said sheet and directed towards said sheet of molten material,
   each die element having a cooling chamber for receiving a circulation of cooling fluid therein and a chamber for receiving atomizing gas under superatmospheric pressure, said chamber having exit ducts which intersect with and are disposed transverse to conduits in communication with said array of orifices such as to provide resonating cavities in both said exit ducts and said orifice conduits,
   said each linear array of orifices converging towards the other and oriented such as to direct atomizing gas under laminar flow conditions against a predetermined focal region of said molten sheet as it is leaving said die space near said orifices,
   and feeding gas under superatmospheric pressure to and through said chambers and said orifices at supersonic rate such as to form shock waves at ultrasonic frequency by virtue of said resonating cavities, thereby to disintegrate said sheet of molten material at said focal region under laminar flow conditions and produce atomized particles of controlled particle size while circulating cooling fluid through the cooling chamber of each of said die elements.

2. The method of atomizing molten material as in claim 1, wherein said shock waves have a frequency of at least about 20,000 cycles per second.

3. The method of atomizing molten material as in claim 2 wherein the frequency of the shock waves ranges from about 20,000 to 100,000 cycles per second.

4. The method of atomizing molten material as in claim 1, wherein the molten material is molten metal.

5. The method of atomizing molten material as in claim 3, wherein the molten material is fed as a molten sheet by confining it in a funnel having a slotted opening of predetermined dimensions in spaced communication with the longitudinally configured die space and by maintaining a head of said material in said funnel as the material flows uniformly through the slotted opening of predetermined dimensions and between the die elements.

6. The method of atomizing molten material as in claim 11, wherein the thickness of the sheet is at least about 2 mm, and wherein the width of the sheet is at least about 10 times the sheet thickness.

7. The method of atomizing molten material as in claim 6, wherein the thickness of the sheet is about 2 to 5 mm, and wherein the width of the sheet is at least about 10 times the sheet thickness.

8. The method of claim 1, wherein the molten material is selected from the group consisting of metals, glasses, ceramics and polymers.

9. A method of producing a spray-cast shape from atomized molten metal which comprises:
  providing a free flowing stream of said molten material in the form of a sheet,
  passing said free flowing sheet of molten material through a longitudinally configured die space of sufficient opening to accommodate said molten material for atomization thereof,
  said die space being defined by opposed linearly configurated die elements each having at least one linear array of gas flow orifices on each side thereof spanning the width of said sheet and directed towards said sheet of molten material,
  each die element having a cooling chamber for receiving a circulation of cooling fluid therein and a chamber for receiving atomizing gas under superatmospheric pressure, said chamber having exit ducts which intersect with and are disposed transverse to conduits in communication with said array of orifices such as to provide resonating cavities in both said exit ducts and said orifice conduits,
  said each linear array of orifices converging towards the other and being oriented such as to direct atomizing gas under laminar flow conditions against a predetermined focal region of said molten sheet through as it is leaving said die space near said orifices,
  feeding gas under superatmospheric pressure to and through said chambers and said orifices at supersonic rate such as to form shock waves at ultrasonic frequency by virtue of said resonating cavities, thereby disintegrating said sheet of molten material at said focal region under laminar flow conditions and produce a spray of liquid atomized particles of controlled particle size while circulating cooling fluid through the cooling chamber of each of said die elements,
  directing said spray of atomized metal particles into a receiving mold, and continuing said spraying into said mold until a metal shape of a desired size is produced.

10. The method of producing a spray-cast metal shape as in claim 9, wherein said shock waves have a frequency of at least about 20,000 cycles per second.

11. The method of producing a spray-cast shape as in claim 10, wherein the frequency of the shock waves ranges from about 20,000 to 100,000 cycles per second.

12. The method of producing a spray-cast shape as in claim 11, wherein the molten metal is fed as a sheet by confining it in a funnel having a slotted opening of predetermined dimensions in spaced communication with the longitudinally configured die space and by maintaining a head of said metal in said funnel as the metal flows uniformly through the slotted opening of predetermined dimensions and between the die elements.

13. The method of producing a spray-cast shape as in claim 9, wherein the thickness of the sheet is at least about 2 mm, and wherein the width of the sheet is at least about 10 times the sheet thickness.

14. The method of producing a spray-cast shape as in claim 13, wherein the thickness of the sheet is about 2 to 5 mm, and wherein the width of the sheet is at least about 10 times the sheet thickness.

15. A linearly configured atomization die for atomizing molten material which normally exists in the solid state at room temperature, said die comprising:
  at least one set of opposed linearly configured die elements spaced in substantially parallel relationship to define a longitudinally configured die space therebetween dimensioned to pass therethrough a sheet of said molten material having a thickness of at least about 1 mm and a width of at least 5 times the thickness,
  said die elements defining a nozzle assembly characterized by oppositely disposed orifice-bearing surfaces, one on each of said linear die elements,
  each of said linear die elements having a chamber for receiving atomizing gas under superatmospheric pressure, exit ducts for delivering said atomizing gas therefrom and a cooling chamber for receiving a circulation of cooling fluid therein,
  each of said oppositely disposed nozzle-defining surfaces forming said nozzle assembly having an array of orifices disposed along and embracing each side of said longitudinally configured die space,
  orifice conduit means communicating said orifices with said gas chamber via said exit ducts,
  each of said exit ducts intersecting with and being disposed transverse to said orifice conduits such as to provide resonating cavities in both the exit ducts and the orifice conduits which cooperate to generate pulsating high frequency shock waves,
  said array of orifices on each die element being convergently directed towards the other and oriented such as to direct atomizing gas under laminar flow conditions against a predetermined focal region of a sheet of molten material as it is leaving said die space near said orifices,
  said high frequency shock waves generated by the resonating cavities disintegrating said sheet of molten material at said focal region into fine particles of controlled particles size.

16. A linearly configured atomization die for atomizing molten material which normally exists in the solid state at room temperature, said die comprising:
  at least one set of opposed linearly configured die elements spaced in substantially parallel relationship to define a longitudinally configured die space therebetween dimensioned to pass therethrough a sheet of said molten material,
  said linear die elements each being adjustably mounted to provide lateral and/or angular positioning relative to an axis between said die elements,
  said die elements defining a nozzle assembly characterized by oppositely disposed orifice-bearing surfaces, one on each of said linear die elements,
  each of said linear die elements having a chamber for receiving atomizing gas under superatmospheric pressure, exit ducts for delivering atomizing gas therefrom and a cooling chamber for receiving a circulation of cooling fluid therein, each of said oppositely disposed nozzle-defining surfaces forming said nozzle assembly having an array of orifices extending along and embracing each side of said longitudinally configurated die space, orifice conduit means communicating said orifices with said gas chamber via said exit ducts, each of said exit ducts intersecting with and being disposed transverse to said orifice conduits such as to provide resonating cavities in both the exit ducts and the orifice conduits which cooperate to generate pulsating high frequency shock waves, said array of orifices on each die element being convergently directed towards the other and oriented such as to direct atomizing gas under laminar flow conditions against a predetermined focal region of a sheet of molten material as it is leaving said die space near space orifices, said high frequency shock waves generated by the resonating cavities disintegrating said sheet of molten material at said focal region into fine particles of controlled particle size.

* * * * *

UNITED STATES PATENT AND TRADEMARK OFFICE
CERTIFICATE OF CORRECTION

PATENT NO. : 4,485,834
DATED : December 4, 1984
INVENTOR(S) : NICHOLAS J. GRANT

It is certified that error appears in the above-identified patent and that said Letters Patent are hereby corrected as shown below:

Claim 6, column 11, line 7, "claim 11" should be --claim 5--.

Claim 9, column 11, line 42, "through" should be deleted.

Claim 16, column 14, line 8, "near space orifices" should be --near said orifices--.

Signed and Sealed this

Tenth Day of September 1985

[SEAL]

Attest:

DONALD J. QUIGG

Attesting Officer    Acting Commissioner of Patents and Trademarks - Designate